UNITED STATES PATENT OFFICE.

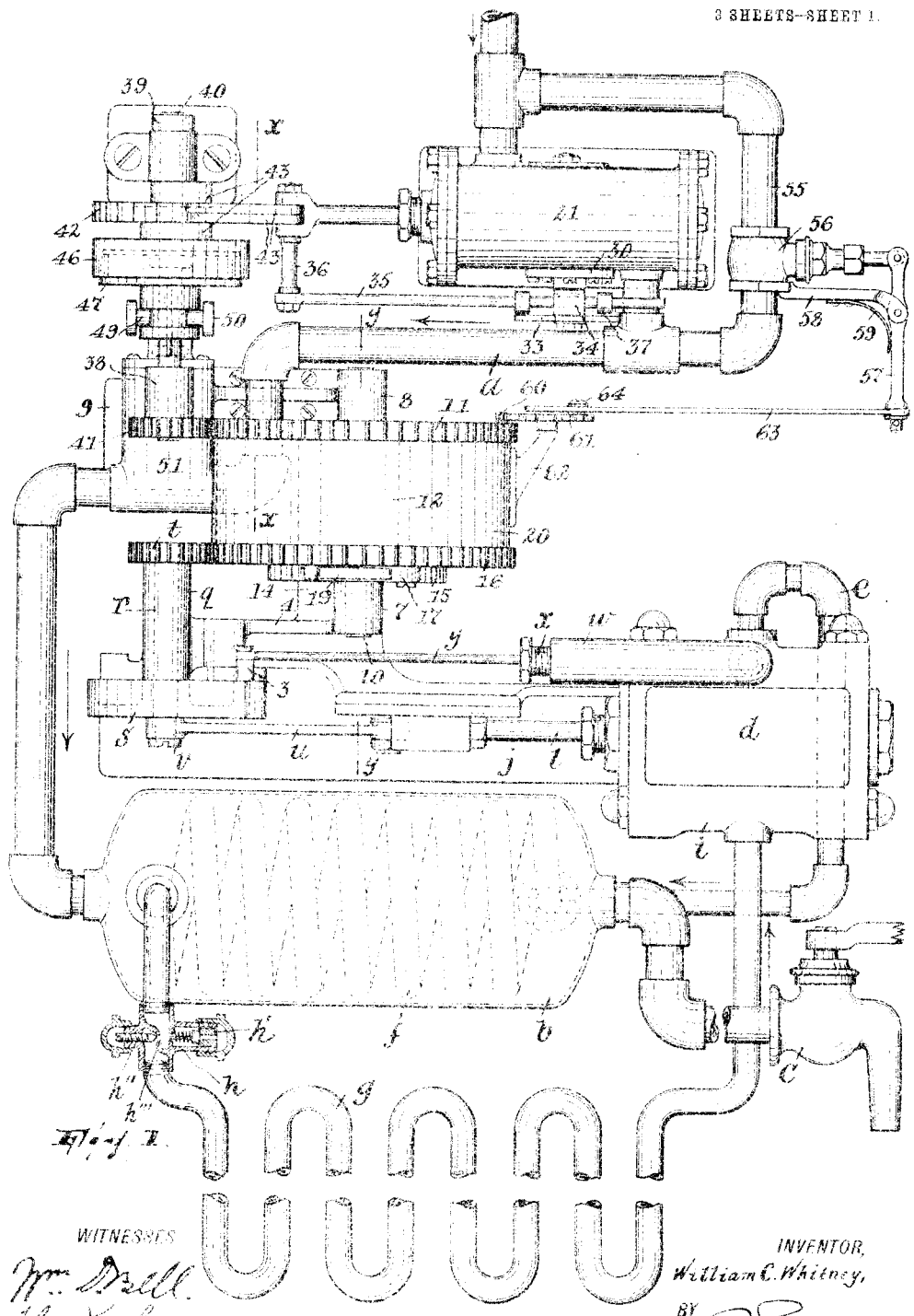

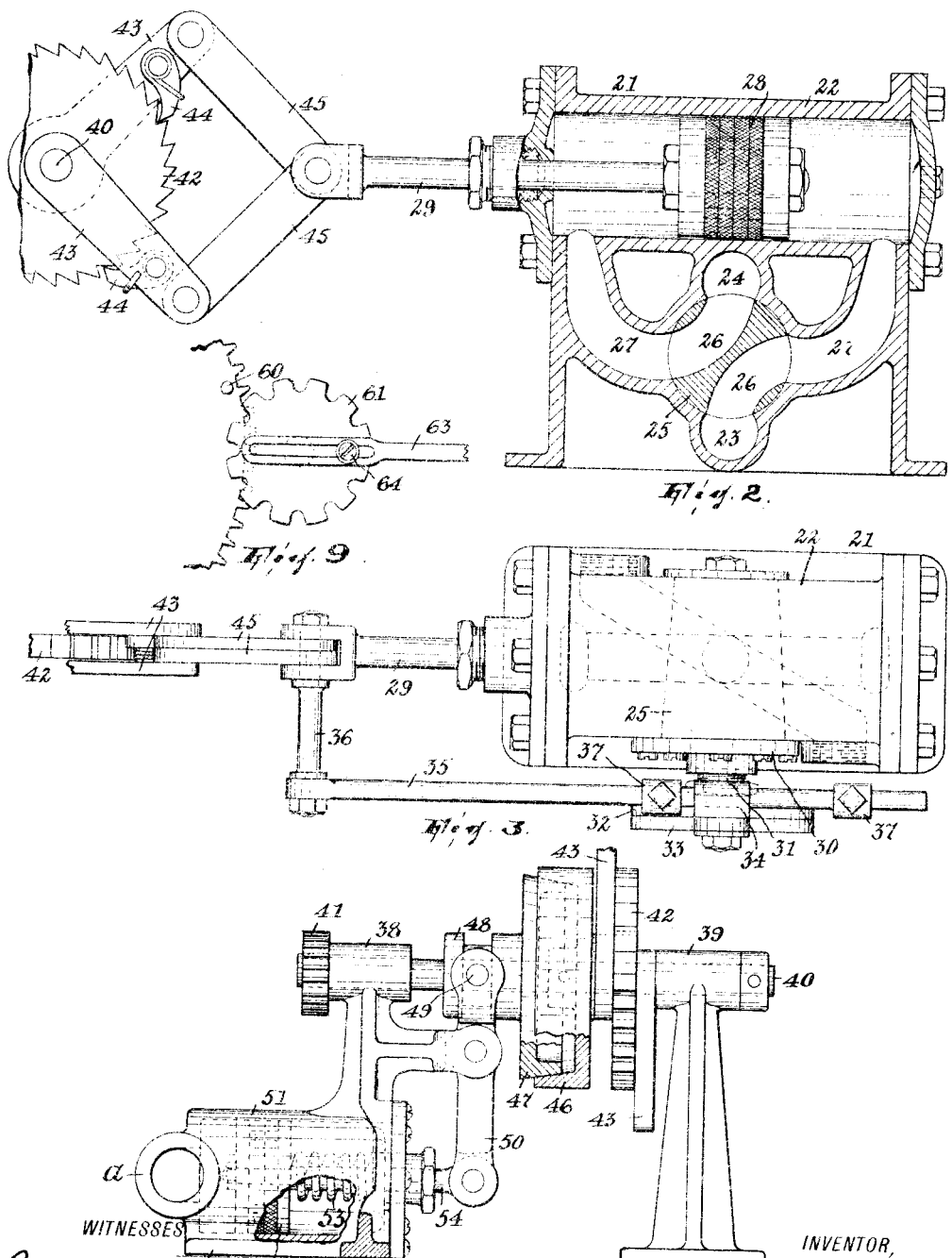

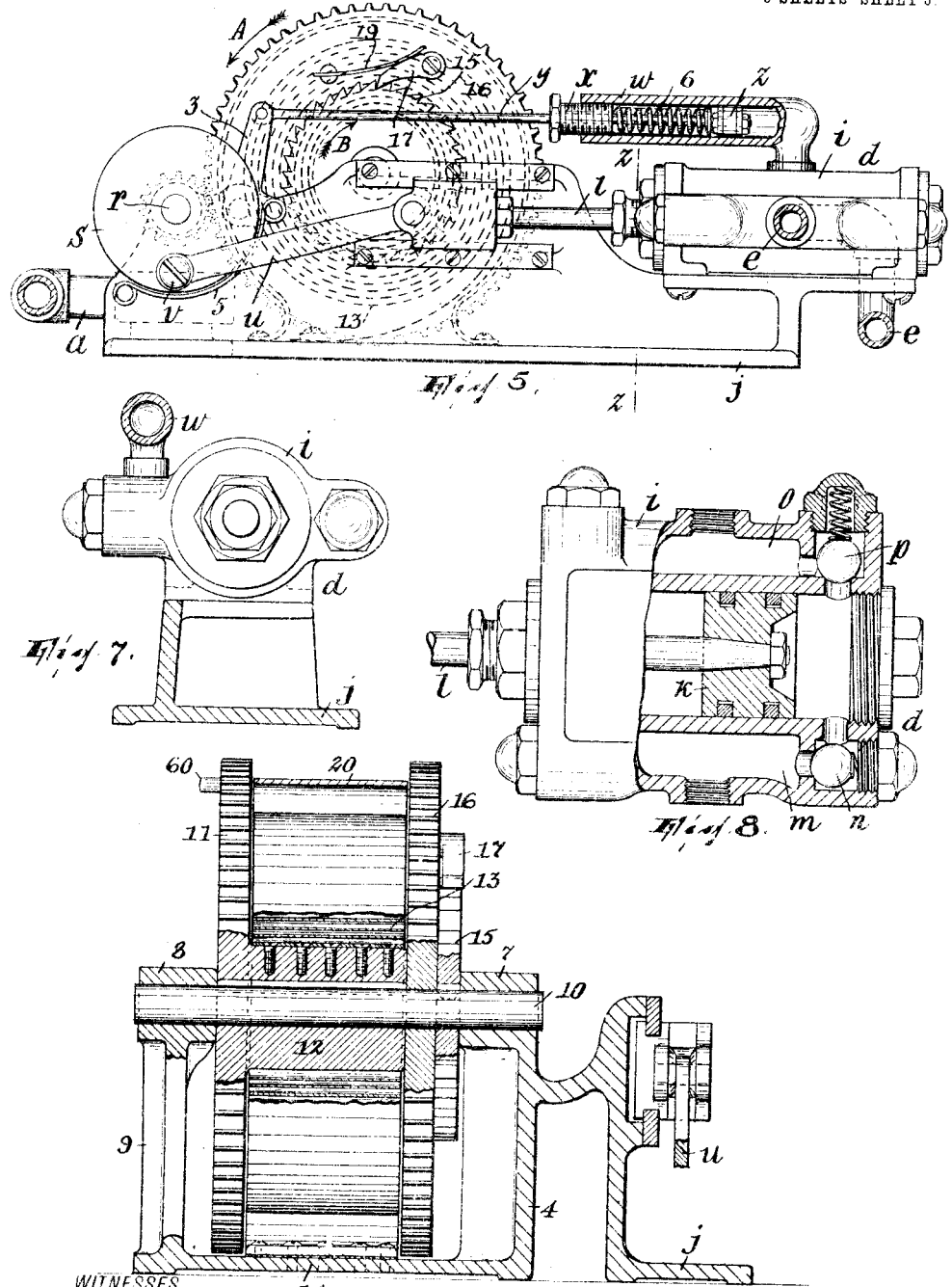

WILLIAM C. WHITNEY, OF NEWBURGH, NEW YORK, ASSIGNOR, BY DIRECT AND MESNE ASSIGNMENTS, TO WHITNEY REFRIGERATION COMPANY, A CORPORATION OF NEW YORK.

MOTOR MECHANISM.

1,063,168.   Specification of Letters Patent.   Patented May 27, 1913.

Application filed March 27, 1912. Serial No. 686,647.

*To all whom it may concern:*

Be it known that I, WILLIAM C. WHITNEY, a citizen of the United States, residing at Newburgh, in the county of Orange and State of New York, have invented certain new and useful Improvements in Motor Mechanisms, of which the following is a specification.

This invention relates to motor mechanisms and particularly to motor mechanisms operated by a moving service fluid and employed in impelling a refrigerant fluid in a refrigerating apparatus to the place or materials to be cooled.

According to this invention, instead of directly applying energy derived from the fluid in the service system to impel the refrigerant, such energy is stored in a suitable storage means and then utilized to actuate the impelling means. In this way I am enabled to employ from among those refrigerant fluids the cooling of which depends on compression followed by expansion some fluid, such as ethyl chlorid, requiring a comparatively low expenditure of energy to compress it enough to produce appreciable transfer of its heat to some adjacent heat-absorbing medium, inasmuch as the energy stored comparatively quickly during what may be termed the "working" periods of the service fluid will suffice, when expended in the relatively sparing manner sufficient for compressing a refrigerant fluid of substantially the character named, for the usually longer idle periods of the service fluid. In the adaptation herein shown and described, a prime mover (serving as the energy storage means) movable back and forth and normally constrained to move forward is employed to actuate the moving element of a compressor, together with means, operated from the service fluid whenever an outlet of the service system is opened and allows the flow of said fluid, for resetting, or setting back, the prime mover for the purpose of replenishing its energy. So far as I am aware the energy-storing feature of my invention is new.

Another novel feature of the invention is that whereby following the resetting or setting back of the prime mover, the operative influence of the service-fluid thereon is automatically cut out so that the prime mover will be free to actuate the compressor; in the preferred form of the invention described and shown this is accomplished by taking advantage of the variation in pressure in the service system due to opening or closing of an outlet thereof.

Still another novel feature is that involving means, controlled by the prime mover, for cutting out the influence of the service-fluid to operate the prime mover when the latter has been set back to a safe or other predetermined limit.

In the accompanying drawings, Figure 1 is a front elevation of the apparatus; Fig. 2 shows the water motor in section and a part of the means for transmitting power from the motor to the prime mover in side elevation; Fig. 3 is a plan view of what is shown in Fig. 2; Fig. 4 is a sectional view on line $x$—$x$ of Fig. 2 and showing on a somewhat larger scale certain parts of the power transmitting means; Fig. 5 is a side elevation of the energy storage means, the compressor, and the means for transmitting power from the storage means to the compressor, this view also showing, partly in section, the means for controlling the storage means; Fig. 6 is a view showing the storage means partly in elevation and partly in section on line $y$—$y$ of Fig. 1; Fig. 7 is a sectional view on line $z$—$z$ of Fig. 5, showing the compressor in end elevation, and Fig. 8 is a plan view, partly in section, of the compressor; and, Fig. 9 shows a part of the means for cutting out the influence of the service-fluid to operate the prime mover or storage means when the latter has been set back to a predetermined limit.

In the drawings a tubular conductor for the service-fluid is represented by the pipe $a$, in which is preferably installed as a part of the conductor a cooling chamber $b$, $c$ being an outlet faucet for the pipe.

$d$ is the compressor arranged to discharge into a pipe $e$ which is extended through the cooling chamber $b$, being therein preferably coiled, as at $f$, and is made to include the coil $g$, the discharge end of the pipe entering the compressor at the inlet side thereof. The compressor operates in the well known way to compress the ethyl chlorid contained in the tubular system including the pipe $e$ and the compressor, the heat of the fluid thus rendered sensible being given off to the service-fluid contained in the cooling chamber $b$, thereupon entering the coil $g$ to adapt the latter as a cooling medium for a refrigerator or the like. At $h$ is a device, having a valved inlet means $h'$ whereby the system including conductor $c$ and compressor $d$ may be charged with the refrigerant fluid and including an adjustable needle valve $h''$ forming with its seat $h'''$ a restricted aperture offering the resistance to the compressor required to produce the desired compression.

Any suitable type of compressor may be employed. In the drawings the compressor comprises a cylinder $i$, suitably mounted on a base $j$; a piston $k$ having a piston rod $l$; and, at the inlet side of the cylinder and leading oppositely to the ends thereof, ports $m$ having relatively outwardly seating spring-pressed ball valves $n$ and, at the outlet side of the cylinder and leading from the ends thereof, ports $o$ having inwardly seating spring-pressed ball valves $p$.

In a bearing $q$ forming a part of the base $j$ is journaled a shaft $r$ carrying at one end a wheel $s$ and at the other end a pinion $t$. A pitman $u$ pivotally connects the piston rod $l$ with a wrist pin $v$ on the wheel $s$. The power to drive the piston of the compressor is transmitted through the parts $t$ $r$, $s$ and $u$ and in order to conserve the energy expended to so much as and no more than is necessary to produce a predetermined degree of compression the following means is employed: $w$ is a cylinder whose interior communicates with the interior of the system comprising pipe $c$ and the compressor and which is preferably affixed to the compressor $d$. Its axis is parallel with the line of thrust of the piston $k$ and it has a gland $x$ in its free end through which extends the rod $y$ of a piston $z$, the end of said rod being attached to the long arm of a bell crank lever 3 pivoted in an upstanding part 4 of the base $j$; to the short arm of the lever is attached one end of a brake band 5 extending partly around the wheel $s$ and having its other end attached to the base. The piston $z$ is normally pressed toward the inlet end of the cylinder $w$ by a spring 6 whose initial resistance is equal to that pressure developed in the compressor which is economically sufficient for the end in view and no more. When the pressure within the cylinder exceeds this limit and overcomes the resistance of the spring 6 the piston will be moved and, through the piston rod $y$ and lever 3, will move the brake band into frictional or braking relation to the wheel $s$, retarding the same and its driving means. Obviously, when the compressing action is thus checked or retarded and the pressure in the cylinder consequently falls spring 6 will cause the brake-band to relax its grip on the wheel $s$.

In a bearing 7 of the part 4 of the base $j$ and in a bearing 8 of a stand 9 is journaled a shaft 10 to which is keyed a gear 11 having a drum 12. To this drum is secured the inner end of a spring 13 coiled around the drum and having its other end attached to a web 14 which may connect the base $j$ and the stand 9. On the shaft 10 is also keyed a ratchet wheel 15, spaced from the free end of the drum 12, and between the ratchet wheel and drum a gear 16 is journaled on said shaft, the same having a pawl 17 held engaged with the teeth of the ratchet wheel by a spring 19. (20 is simply a cylindrical shell secured to the web 14 and inclosing the spring 13.) It will be apparent that when the spring is wound by rotating the gear 11 and the drum in the direction of the arrow A shown in Fig. 5 and then released it will rotate the ratchet wheel in the direction of the arrow B in said figure, the power being transmitted from the ratchet wheel through the pawl and gear 16 to the pinion $t$.

21 illustrates a water-motor, the same comprising a cylinder 22 having an inlet port 23, an exhaust port 24, an oscillating valve 25 provided with ports 26 each of which alternately places one of two ports 27 leading to opposite ends of the cylinder in communication with the inlet and exhaust ports and a reciprocating piston 28 having the piston rod 29. The motor 21 is placed in the pipe $a$ in the usual manner so that the water passing through said pipe flows into the motor through its inlet port 23 and, having performed work in moving the piston 28, discharges from the motor, at the port 24. The valve 25 has its axial stem (not shown) extended through a plate 30 covering the bore in which the valve oscillates and also through a gland 31, having a disk-shaped enlargement 32 which affords a broad face for a similar face of the disk part of a lever 33 secured to the stem of the valve and having pivoted to its free end a block 34. The block 34 is penetrated by a rod 35 pivoted to an arm 36 projecting laterally from the piston rod 29 and it carries spaced collars 37 which, as the rod is reciprocated from the piston rod, alternately engage and move block 34 to oscillate the valve 25.

In a bearing 38 of the stand 9 and in a bearing forming part of a stand 39 is journaled a shaft 40 having a pinion 41 meshing with the gear 11. Revoluble on the shaft 40 is a ratchet wheel 42 and on opposite sides of the ratchet wheel are the levers 43 having spring-actuated pawls 44 engaging the ratchet wheel. The ends of the lever are connected by links 45 with the piston rod 29 and the relation of the parts is such that when the piston rod is reciprocated the ratchet wheel is advanced by one pawl or the other on each thrust of the piston rod. One lever 43 may be fulcrumed directly on the shaft 40 and the other on a hub (not shown) connecting parts 42 and 46. Rotating with the ratchet wheel is a clutch member 46 coactive with a clutch member 47 splined on said shaft, clutch member 47 having a peripherally grooved hub 48 receiving the pins 49 of the forked end of a lever 50 which is fulcrumed in the stand 9.

The stand 9 includes a cylinder 51 which communicates with the interior of the conductor $a$ and in which is arranged a piston 52 supported against the pressure in the conductor $a$ by a spring 53 which is coiled between the piston and the closed end of the cylinder around the piston rod 54; the latter is pivoted to the free end of the lever 50.

The pipe $a$ has a by-pass 55 containing a valve 56 having attached thereto one end of a lever 57 which is fulcrumed in a suitable bracket 58 and is pressed upon by a spring 59, normally holding the valve closed. From the gear 11 projects a stud 60 engageable with a star wheel 61 which is journaled in a bracket 62 projecting from the shell 20. 63 is a pitman having one end attached to the lever 57 and the other end slotted and receiving a stud 64 on the star wheel. When the gear wheel 11 performs that number of revolutions which corresponds to the limit to which the spring 13 may be wound it will have rotated the star wheel a half-revolution, causing the latter, through the pitman and lever 57, to open the valve 56 and allow the service-water to flow around instead of through, and against the resistance opposed by, the motor.

Operation: Assuming that the spring 13 has been put under tension by the rotation of the drum 12 and that the faucet $c$ is closed, the pressure of the service fluid will be maintaining the clutch (46—47) open so that shaft 10 will be free to rotate, unhampered by the motor, in response to the effort of the spring 13 to unwind and thus rotate the parts 11, 12 and 15. In the rotation of the ratchet-wheel 15 gear-wheel 16 will, through pawl 17, be rotated with it, the rotary motion of the gear-wheel being transmitted to the parts $t$, $r$ and $s$ and causing the reciprocation of the piston of the compressor $d$. The desired refrigerating condition will thus be set up in the coil $g$ in the well-known manner, the refrigerant fluid being caused by the compressor to traverse the coil $f$ and thus give off the heat thereof consequent upon its compression to the body of service water contained in the chamber $b$. If, during this period, the effort of the prime mover (spring 13) exceeds what is sufficient for the purpose in hand the excess pressure in the tubular system containing the refrigerant fluid will operate, as already described, to arrest or retard the prime mover by causing the brake-band 5 to be applied to the wheel $s$ through the medium of the cylinder $w$ and piston $z$, the resistance thus offered terminating as soon as the pressure in said system again assumes or falls below the limit determined by the resistance of spring 6. When, now, the faucet $c$ is opened and the service water is thus allowed to flow the motor 21 will be actuated and, the pressure in the conductor now falling below that exerted by the spring 53 so that the latter closes the clutch (46—47), will transmit the power required to wind the spring 13 through the transmission means now operatively connecting the motor with said spring. The winding of the spring will continue until the faucet being closed the water motor stops; in any event the winding will cease when the gear-wheel 11 has performed that number of revolutions which is required in order to turn the star-wheel 61 through a half-revolution, whereupon the valve 56 will be opened in the manner already described, allowing the water to flow through the by-pass and causing the motor 21 thus to be cut out.

Having thus fully described my invention, what I claim as new and desire to secure by Letters Patent is:—

1. In a refrigerating apparatus, the combination of a driven element, a conductor for the service-fluid and mechanism for causing the energy developed by the moving service-fluid to drive said element including means for storing the energy developed by the moving service-fluid and means for transmitting the stored energy to said element, substantially as described.

2. In a refrigerating apparatus, the combination of an energy-storing member movable back and forth and normally constrained to move forward, a conductor for the service-fluid, and means, operated by the moving service-fluid, for setting back said energy-storing member from time to time, said means including a service-fluid-pressure-controlled power-transmitting clutch, substantially as described.

3. In a refrigerating apparatus, the combination of an energy-storing member movable back and forth and normally constrained to move forward, a conductor for the service-fluid having means for alternately allowing and checking the flow of the fluid therethrough, and means, operated by the moving service-fluid, for setting back said energy-storing member from time to time, said means including a normally closed service-fluid-pressure-opened power-transmitting clutch, substantially as described.

4. In a refrigerating apparatus, the combination of an energy-storing member movable back and forth and normally constrained to move forward, means, including a service-fluid motor, for setting back said energy-storing member from time to time, and means, having a service-fluid-controlling valve controlled by said member, for conducting the service-fluid to the motor, substantially as described.

5. In a refrigerating apparatus, the combination of an energy-storing member movable back and forth and normally constrained to move forward, means, including a service-fluid motor, for setting back said energy-storing member from time to time, a service-fluid conductor containing the motor and having a by-pass around the latter, and means, including a valve in the by-pass controlled by said member, for controlling the influence of the service-fluid on the motor, substantially as described.

In testimony whereof I affix my signature in presence of two witnesses.

WILLIAM C. WHITNEY.

Witnesses:
 JOHN W. STEWARD,
 WM. D. BELL.